US012494177B2

(12) United States Patent
Xiang et al.

(10) Patent No.: US 12,494,177 B2
(45) Date of Patent: Dec. 9, 2025

(54) DISPLAY DEVICE

(71) Applicants: WUHAN BOE OPTOELECTRONICS TECHNOLOGY CO., LTD., Hubei (CN); BOE Technology Group Co., Ltd., Beijing (CN)

(72) Inventors: Jianmin Xiang, Beijing (CN); Lijun Xiao, Beijing (CN); Peng Jiang, Beijing (CN); Bing Li, Beijing (CN); Junmin Zhang, Beijing (CN); Meng Feng, Beijing (CN); Feng Jiang, Beijing (CN); Kai Cheng, Beijing (CN); Mengchao Shuai, Beijing (CN); Hangyu Chen, Beijing (CN); Yun Bai, Beijing (CN); Ziming Yang, Beijing (CN); Yuxi Xiang, Beijing (CN); Dongxu Yuan, Beijing (CN); Wei Fu, Beijing (CN)

(73) Assignees: Wuhan BOE Optoelectronics Technology Co., Ltd., Hubei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/686,559

(22) PCT Filed: Dec. 15, 2022

(86) PCT No.: PCT/CN2022/139390

§ 371 (c)(1),
(2) Date: Feb. 26, 2024

(87) PCT Pub. No.: WO2024/124494

PCT Pub. Date: Jun. 20, 2024

(65) Prior Publication Data

US 2024/0428741 A1 Dec. 26, 2024

(51) Int. Cl.
*G09G 3/3275* (2016.01)
*G09G 3/36* (2006.01)

(52) U.S. Cl.
CPC ......... *G09G 3/3275* (2013.01); *G09G 3/3688* (2013.01); *G09G 2320/0233* (2013.01)

(58) Field of Classification Search
CPC ............... G09G 3/3275; G09G 3/3688; G09G 2320/0233; G09G 3/20; G02F 1/133
See application file for complete search history.

(56) References Cited

U.S. PATENT DOCUMENTS

2005/0174311 A1* 8/2005 Huh .................... G09G 3/3233 345/87
2005/0174344 A1* 8/2005 La ........................ G02F 1/1362 345/208

(Continued)

FOREIGN PATENT DOCUMENTS

CN 109473075 A 3/2019
CN 109994085 A 7/2019

(Continued)

*Primary Examiner* — Grant Sitta
(74) *Attorney, Agent, or Firm* — WHDA, LLP

(57) ABSTRACT

A display device includes a display panel including a plurality of gate lines and a plurality of data lines, the plurality of gate lines intersecting and being insulated with the plurality of data lines, the display panel further including a plurality of sub-pixels arranged in an array, and the plurality of gate lines and the plurality of data lines defining areas where the sub-pixels are located; a gate driver electrically connected to the plurality of gate lines in the display panel; and a source driver bound to the display panel and electrically connected to the plurality of data lines in the display panel, the source driver being configured to set data transmission start time for respective data lines so that effective charging time of respective sub-pixels formed by the plurality of data lines and a same gate line is same.

16 Claims, 5 Drawing Sheets

(56) References Cited

U.S. PATENT DOCUMENTS

| | | | | |
|---|---|---|---|---|
| 2009/0085927 | A1* | 4/2009 | Jung | G09G 3/3648<br>345/87 |
| 2017/0004799 | A1* | 1/2017 | Park | G09G 3/3688 |
| 2018/0046007 | A1* | 2/2018 | Lee | G09G 3/3241 |
| 2018/0240423 | A1* | 8/2018 | Park | G09G 3/3685 |
| 2020/0357327 | A1* | 11/2020 | Lee | G09G 3/2092 |
| 2020/0394968 | A1* | 12/2020 | Kwon | G09G 3/3266 |
| 2021/0055596 | A1* | 2/2021 | Wu | G09G 3/20 |
| 2021/0201838 | A1* | 7/2021 | Wei | G09G 3/3666 |
| 2021/0287594 | A1* | 9/2021 | Kim | G09G 3/2096 |
| 2022/0344449 | A1* | 10/2022 | Jiang | G02F 1/1345 |
| 2023/0178016 | A1* | 6/2023 | Liu | H10H 29/10<br>345/694 |
| 2023/0378411 | A1* | 11/2023 | Zhu | H01L 25/167 |
| 2024/0038136 | A1* | 2/2024 | Cai | G09G 3/20 |
| 2024/0119884 | A1* | 4/2024 | Wang | G09G 3/3677 |

FOREIGN PATENT DOCUMENTS

| | | | |
|---|---|---|---|
| CN | 113570997 | A | 10/2021 |
| CN | 115188312 | A | 10/2022 |
| KR | 20040035276 | A | 4/2004 |
| KR | 20120002011 | A | 1/2012 |
| KR | 20170073309 | A | 6/2017 |

* cited by examiner

DISPLAY DEVICE

TECHNICAL FIELD

The present application relates to the technical field of displaying and more particularly, to a display device.

BACKGROUND

Uneven brightness in vertical regions in a horizontal direction (V-Block) is a common defect in large-size display devices, especially evident on large-size display devices with a low charging rate such as those of Dualgate, high-refresh-rate and 8K-resolution types.

At present, main ways to solve the above problem include Fanout resistance compensation and GDE (Gate Discharge Equilibrium)/PPCC (programmable panel charging compensation) compensation. However, there are many problems in current compensation methods, which result in inability to effectively solve the V-Block problem and poor user experience.

SUMMARY

Embodiments of the present application incorporate following technical schemes.

In an aspect, a display device is provided in an embodiment of the present disclosure, which includes:

- a display panel including a plurality of gate lines and a plurality of data lines, wherein the plurality of gate lines intersect and are insulated with the plurality of data lines, the display panel further includes a plurality of sub-pixels arranged in an array, and the plurality of gate lines and the plurality of data lines define areas where the sub-pixels are located;
- a gate driver electrically connected to the plurality of gate lines in the display panel; and
- a source driver bound to the display panel and electrically connected to the plurality of data lines in the display panel, wherein the source driver is configured to set data transmission start time for respective data lines, so that effective charging time of respective sub-pixels formed by the plurality of data lines and a same gate line is same.

Optionally, the source driver includes a source driving unit;

- the gate driver is configured to transmit a gate signal in a first preset time range to the gate line; and
- the source driving unit is configured to transmit data signals to the plurality of data lines, any of a plurality of data lines intersecting a same gate line is taken as a first reference data line, and data transmission start time of the first reference data line is taken as reference time; and
- in a case that among the plurality of data lines intersecting the same gate line, a gate signal on the gate line at an intersection with the first reference data line is transmitted earliest, data transmission start time of data lines except the first reference data line among the plurality of data lines is later than the reference time, so that effective charging time of respective sub-pixels formed by the plurality of data lines electrically connected to the source driving unit and the same gate line is the same;
- in a case that among the plurality of data lines intersecting the same gate line, the gate signal on the gate line at the intersection with the first reference data line is transmitted latest, data transmission start time of the data lines except the first reference data line among the plurality of data lines is earlier than the reference time, so that effective charging time of respective sub-pixels formed by the plurality of data lines electrically connected to the source driving unit and the same gate line is the same; and
- in a case that among the plurality of data lines intersecting the same gate line, the gate signal on the gate line at the intersection with the first reference data line is transmitted midway, among the plurality of data lines, data transmission start time of a data line of which a data signal is transmitted earlier than the gate signal on the gate line at the intersection with the first reference data line is earlier than the reference time; and among the plurality of data lines, data transmission start time of a data line of which a data signal is transmitted later than the gate signal on the gate line at the intersection with the first reference data line is later than the reference time, so that the effective charging time of the respective sub-pixels formed by the plurality of data lines electrically connected to the source driving unit and the same gate line is the same.

Optionally, all of the data lines include a plurality of first data line groups, and each first data line group includes a plurality of data lines;

- the source driving unit is configured to take any of the plurality of first data line groups intersecting the same gate line as a first reference data line group, and take data transmission start time of the first reference data line group as a reference time; and
- in a case that among the plurality of first data line groups intersecting the same gate line, a gate signal on the gate line at an intersection with the first reference data line group is transmitted earliest, data transmission start time of first data line groups except the first reference data line group among the plurality of first data line groups is later than the reference time, so that effective charging time of respective sub-pixels formed by data lines in the plurality of first data line groups electrically connected to the source driving unit and the same gate line is the same;
- in a case that among the plurality of first data line groups intersecting the same gate line, the gate signal on the gate line at the intersection with the first reference data line group is transmitted latest, data transmission start time of the first data line groups except the first reference data line group among the plurality of first data line groups is earlier than the reference time, so that effective charging time of respective sub-pixels formed by data lines in the plurality of first data line groups electrically connected to the source driving unit and the same gate line is the same; and
- in a case that among the plurality of first data line groups intersecting the same gate line, the gate signal on the gate line at the intersection with the first reference data line group is transmitted midway, among the plurality of first data line groups, data transmission start time of a first data line group of which a data signal is transmitted earlier than the gate signal on the gate line at the intersection with the first reference data line group is earlier than the reference time; and among the plurality of first data line groups, data transmission start time of a first data line group of which a data signal is transmitted later than the gate signal on the gate line at the intersection with the first reference data line group is later than the reference time, so that effective charging time of respective sub-pixels formed by data lines in the plurality of first data line groups electrically connected to the source driving unit and the same gate line is the same.

Optionally, a quotient of a number of all of data lines and a number of all of the first data line groups is an integer, and a number of the data lines in each first data line group is the same.

Optionally, the source driving unit is configured such that all of data lines in each first data line group include a plurality of first sub-data line groups, and each of the plurality of first sub-data line groups include at least one data line; and any of a plurality of first sub-data line groups intersecting the same gate line is taken as a second reference data line group, and data transmission start time of the second reference data line group is taken as a reference time;

in a case that among the plurality of first sub-data line groups intersecting the same gate line, a gate signal on a gate line at an intersection with the second reference data line group is transmitted earliest, data transmission start time of first sub-data line groups except the second reference data line group among the plurality of first sub-data line groups is later than the reference time, so that effective charging time of respective sub-pixels formed by data lines in the plurality of first sub-data line groups electrically connected to the source driving unit and the same gate line is the same;

in a case that among the plurality of first sub-data line groups intersecting the same gate line, the gate signal on the gate line at the intersection with the second reference data line group is transmitted latest, data transmission start time of the first sub-data line groups except the second reference data line group among the plurality of first sub-data line groups is earlier than the reference time, so that effective charging time of respective sub-pixels formed by data lines in the plurality of first sub-data line groups electrically connected to the source driving unit and the same gate line is the same; and in a case that among the plurality of first sub-data line groups intersecting the same gate line, the gate signal on the gate line at the intersection with the second reference data line group is transmitted midway, among the plurality of first sub-data line groups, data transmission start time of a first sub-data line group of which a data signal is transmitted earlier than the gate signal on the gate line at the intersection with the second reference data line group is earlier than the reference time; and among the plurality of first sub-data line groups, data transmission start time of a first sub-data line group of which a data signal is transmitted later than the gate signal on the gate line at the intersection with the second reference data line group is later than the reference time, so that effective charging time of respective sub-pixels formed by data lines in the plurality of first sub-data line groups electrically connected to the source driving unit and the same gate line is the same.

Optionally, data transmission start time of all of the data lines in each first sub-data line group is the same.

Optionally, the plurality of first sub-data line groups are arranged in a direction away from the gate driver sequentially, and the source driving unit is configured to take any of the plurality of first sub-data line groups intersecting the same gate line as a third reference data line group, and take data transmission start time of the third reference data line group as a reference time;

in a case that among the plurality of first sub-data line groups intersecting the same gate line, the third reference data line group is located closest to the gate driver, data transmission start time of first sub-data line groups except the third reference data line group among the plurality of first sub-data line groups is later than the reference time, so that effective charging time of respective sub-pixels formed by data lines in the plurality of first sub-data line groups electrically connected to the source driving unit and the same gate line is the same;

in a case that among the plurality of first sub-data line groups intersecting the same gate line, the third reference data line group is located farthest from the gate driver, data transmission start time of the first sub-data line groups except the third reference data line group among the plurality of first sub-data line groups is earlier than the reference time, so that effective charging time of respective sub-pixels formed by data lines in the plurality of first sub-data line groups electrically connected to the source driving unit and the same gate line is the same; and in a case that among the plurality of first sub-data line groups intersecting the same gate line, the third reference data line group is located in the middle of a distance from the gate driver, among the plurality of first sub-data line groups, data transmission start time of a first sub-data line group which is closer to the gate driver than the third reference data line group is earlier than the reference time; and among the plurality of first sub-data line groups, data transmission start time of a first sub-data line group which is farther from the gate driver than the third reference data line group is later than the reference time, so that effective charging time of respective sub-pixels formed by data lines in the plurality of first sub-data line groups electrically connected to the source driving unit and the same gate line is the same.

Optionally, all of the data lines intersecting the same gate line include M first data line groups, and the M first data line groups are sorted in the direction away from the gate driver sequentially; and in a first mode, among the M first data line groups, a number of data lines in a first data line group of an N-th sequence is the same as that of data lines in a first data line group of an (M−N+1)-th sequence, and both of which are even numbers, where M is an even number greater than or equal to 2, and N is an integer greater than or equal to 1.

Optionally, in the direction away from the gate driver, data transmission start time of respective first data line groups increases sequentially.

Optionally, each of the plurality of first data line groups intersecting the same gate line includes an even number of the first sub-data line groups; and in the direction away from the gate driver, a number of the first sub-data line groups in each first data line group increases sequentially.

Optionally, in the direction away from the gate driver, data transmission start time of the first sub-data line groups in respective first data line groups is sequentially increased by a same multiple.

Optionally, the source driver includes a plurality of source driving units;

the gate driver is configured to transmit a gate signal in a first preset time range to the gate line; and the plurality of data lines are divided into a plurality of groups, and each source driving unit is electrically connected to one group of the data lines, any of the plurality of source driving units is taken as a reference source driving unit, and rest of the source driving units except the reference source driving unit are adjusting source driving units; any data line in the plurality of groups of the data lines intersecting the same gate line electrically connected to the reference source driving unit is taken as a second reference data line, and data transmission start time of the second reference data line is taken as a reference time; one of data lines electrically connected to the reference source drive unit closest to an adjacent adjusting source drive unit is a first data line, and a data line in the adjusting source drive unit closest to the reference source drive unit is a second data line; and in a case that among the plurality of groups of the data lines intersecting the same gate line, a gate signal on a gate line at an intersection with the second reference data line is transmitted earliest, data transmission start time of the first data line is later than the reference time, and the data transmission start time of the first data line is the same as that of the second data line, so that effective charging time of respective sub-pixels formed by data lines in the plurality of groups of the data lines electrically connected to the source driving unit and the same gate line is the same.

Optionally, all of the data lines electrically connected to the reference source driving unit are divided into a first part and a second part, the first part includes the second reference data line, and data transmission delay time of all of data lines in the first part is different from that of all of data lines in the second part.

Optionally, in the first mode, the data transmission delay time of all of the data lines in the first part is greater than that of all of the data lines in the second part.

Optionally, the source driving unit includes a data input module, a multi-channel delay control module, a digital-to-analog conversion module, an output module and a logic control module;

the data input module is electrically connected to both the logic control module and the multi-channel delay control module, and is configured to: receive and analyze a video signal under control of a first control signal of the logic control module, to obtain first data of the video signal; and transmit the first data to the multi-channel delay control module;

the multi-channel delay control module is electrically connected to both the logic control module and the digital-to-analog conversion module, and is configured to: receive and analyze the first data under control of a second control signal of the logic control module, to obtain second data of respective data lines with different start time; and transmit the second data to the digital-to-analog conversion module;

the digital-to-analog conversion module is further electrically connected to the output module and is configured to: receive and convert the second data, to obtain third data; and transmit the third data to the output module; and the output module is configured to receive and output the third data.

Optionally, the multi-channel delay control module includes a mode selection submodule, a data selection submodule, a first grouping control submodule, a second grouping control submodule and a delay submodule;

the mode selection submodule is electrically connected to the data selection submodule and is configured to: receive the first data under control of the second control signal of the logic control module and select a delay mode; and transmit the first data to the data selection submodule;

the data line selection submodule is further electrically connected to the first grouping control unit and is configured to: receive the first data under the control of the second control signal of the logic control module, determine the delay mode, and select a starting data line according to the delay mode; and transmit the first data to the first grouping control submodule;

the first grouping control sub-module is further electrically connected to the second grouping control unit and is configured to: receive the first data under the control of the second control signal of the logic control module, and determine the first data line group according to the starting data line;

the second grouping control sub-module is further electrically connected to the delay unit and is configured to: receive the first data under the control of the second control signal of the logic control module and determine a first sub-data line group according to the first data line group; and the delay sub-module is configured to: receive the first data under the control of the second control signal of the logic control module, and analyze the first data according to the first sub-data line group, to obtain the second data of data lines in the first sub-data line group with different start time.

The above description is only an overview of the technical solution of the present application. In order to have a clearer understanding of the technical means of the present application, it can be implemented according to the content of the specification. In order to make the above and other purposes, features, and advantages of the present application more obvious and easier to understand, the specific implementation methods of the present application are listed below.

BRIEF DESCRIPTION OF THE DRAWINGS

In order to provide a clearer explanation of the technical solutions in the embodiments of the present application or related art, a brief introduction will be made to the accompanying drawings required in the descriptions of the embodiments or prior art. It is evident that the accompanying drawings in the following description are only some embodiments of the present application. For those skilled in the art, other accompanying drawings can be obtained based on these drawings without creative labor.

DETAILED DESCRIPTION

Figure 1:
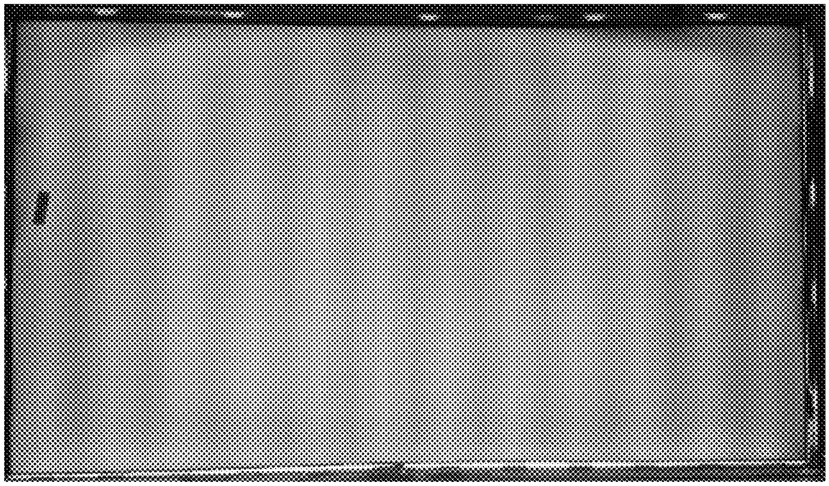
FIG. 1 is a schematic diagram of a display panel in related art with a V-Block problem.

In order to clarify the purpose, technical solution, and advantages of the embodiment of the present application, the following will provide a clear and complete description of the technical solution in the embodiment of the present application in conjunction with the accompanying drawings. Obviously, the described embodiment is a part of the embodiments of the present application, not the entire embodiments. Based on the embodiments in the present application, all other embodiments obtained by persons skilled in the art without creative labor fall within the scope of protection of the present application.

In the embodiments of the present application, unless otherwise specified, "plurality of" means two or more. The orientation or positional relationship indicated by terms such as "up" is based on the orientation or positional relationship shown in the drawings, and is only for the convenience of describing the present application and simplifying the description, rather than indicating or implying that the structure or element referred to must have a specific orientation, be constructed and operated in a specific orientation, and therefore cannot be understood as a limitation on the present application.

Unless the context otherwise requires, in the entire specification and claims, the term "comprise/include" is interpreted as open and inclusive, meaning "including, but not limited to". In the description of the specification, the terms "one embodiment", "some embodiments", "exemplary embodiments", "examples", "specific examples", or "some examples", etc. are intended to indicate that specific features, structures, materials, or features related to the embodiment or example are included in at least one embodiment or example of the present application. The schematic representation of the above terms may not necessarily refer to the same embodiment or example. Furthermore, the specific features, structures, materials, or features described may be included in any one or more embodiments or examples in any appropriate manner.

In the embodiments of the present application, the use of words such as "first" and "second" to distinguish similar or identical items with similar functions and effects is only for the purpose of clearly describing the technical solution of the embodiments of the present application, and cannot be understood as indicating or implying relative importance or implying the number of indicated technical features.

With development of science and technology, display devices of Dualgate, high-resolution (for example, 8K resolution) and high-refresh-rate (for example, 240 Hz) types are more and more popular. V-Block is a common defect in large-size display devices, especially in large-size display devices with a low charging rate such as those of Dualgate, high-refresh-rate and 8K-resolution types. Taking a large-size display device of 8K-resolution type as an example, turning-on time of a row of pixels is short, and because every row of Data (data) signals output by a source driving integrated circuit (IC) are all transitioning and the pixels are not pre-charged, which results in less effective pixel charging time. With increase of resolution of the display device, more pixels are to be driven in a unit area, which results in the display device being unable to be charged effectively, and the V-Block problem in which a part of a frame is insufficiently charged due to the short charging time as shown in FIG. 1 is liable to occur.

In related art, Fanout resistance compensation is to design Fanout compensation of the source driver IC in advance. That is, by designing wirings of different channels (namely, Data lines) on the source driver IC, impedance difference between different Data lines matches impedance difference of the display panel in the display device, so as to achieve a purpose of compensation for charging. Disadvantages of this method mainly lie in that once the wirings of the Data lines are completed, they cannot be adjusted, with single matching of the display panel, no shared materials, and unstable matching between compensation and the display pane. At present, GDE/PPCC compensation is to alleviate V-Block by controlling the source driver IC. Disadvantages of this method mainly lie in a single compensation setting manner and no compensation for uneven difference between the Data lines.

Figure 2:
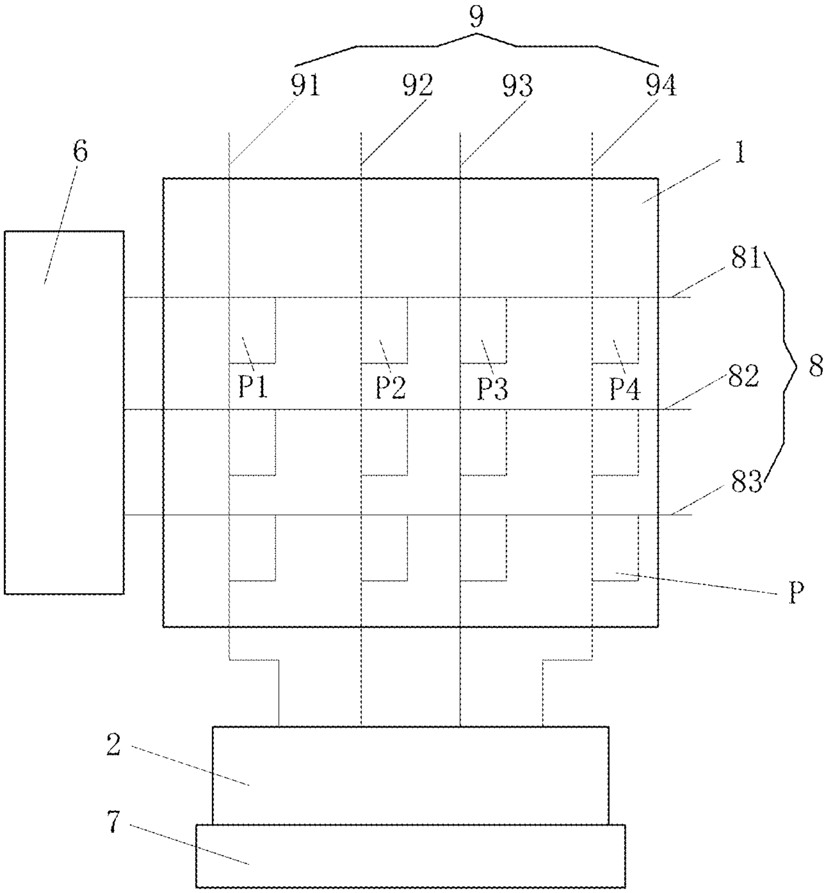
FIG. 2 is a schematic structural diagram of a display device according to an embodiment of the present disclosure.

A display device is provided in an embodiment of the present disclosure, as shown in FIG. 2, which includes:

- a display panel 1 including a plurality of gate lines 8 and a plurality of data lines 9, the plurality of gate lines 8 intersecting and being insulated with the plurality of data lines 9, the display panel 1 further including a plurality of sub-pixels P arranged in an array, and the plurality of gate lines 8 and the plurality of data lines 9 defining an area where the sub-pixels P are located; and
- a gate driver 6 is electrically connected to the plurality of gate lines 8 in the display panel 1; and
- a source driver 2 bound to the display panel 1 and electrically connected to the plurality of data lines 9 in the display panel 1, the source driver 2 being configured to set data transmission start time for respective data lines 9 so that effective charging time of respective sub-pixels P formed by the plurality of data lines 9 and a same gate line 8 is same.

Here, a type of the display panel is not specifically limited, and it can be an LCD (Liquid Crystal Display) or an OLED (Organic Light Emitting Diode) display panel.

Here, a relationship between numbers of gate lines and data lines described above is not specifically limited. For example, the number of the gate lines may be the same as that of the data lines. Alternatively, the number of the gate lines may be different from that of the data lines. Actual numbers of the gate lines and the data lines can be determined according to a number of sub-pixels, an area of the display panel, and the like. FIG. 2 shows a display panel including three gate lines 8 and four data lines 9 as an example. At this time, the number of gate lines 8 is different from that of data lines 9. It should be noted that actual products, such as large-size products, have a large number of gate lines and data lines, and FIG. 2 does not show all of the gate lines and data lines.

Here, the number of the sub-pixels is not specifically limited. For example, the number of the sub-pixels may be one; alternatively, the number of the sub-pixels may be multiple. The number of the sub-pixels may be determined according to the numbers of gate lines and data lines. FIG. 2 shows a display panel including twelve sub-pixels p as an example.

Here, colors of above sub-pixels are not specifically limited. When the display panel includes a plurality of sub-pixels, the colors of the sub-pixels may all be the same; alternatively, the colors of the sub-pixels may be partially the same; alternatively, the colors of the above sub-pixels may be different from each other. For example, the display panel may include a red sub-pixel, a green sub-pixel, and a blue sub-pixel.

A specific positional relationship between the gate driver and the display panel is not limited. For example, the gate driver 6 may be arranged at a side of the display panel 1 as shown in FIG. 2. Alternatively, the gate driver can also be arranged around the display panel. Of course, the gate driver can be arranged in other manners, which are not listed here and can be specifically determined according to actual requirements.

A number of the gate drivers is not specifically limited. For example, as shown in FIG. 2, there is one gate driver 6 provided. Of course, there may be also multiple gate drivers provided.

A type of the gate driver is not specifically limited. For example, the gate driver may be a GOA (Gate Driver On Array) circuit.

A specific positional relationship between the source driver and the display panel is not limited. For example, as shown in FIG. 2, the source driver 2 can be arranged at a side of the display panel 1 and bound to a side of the display panel 1. Alternatively, the source driver can also be arranged around the display panel and bound to a peripheral side of the display panel. Certainly, the source driver can also be arranged in other manners, which are not listed here and can be specifically determined according to actual requirements.

A number of the source drivers is not specifically limited. For example, as shown in FIG. 2, there is one source driver 2 provided. Certainly, there may be also multiple source drivers provided.

A specific way in which the source driver is electrically connected to the data lines is not limited. For example, the source driver can be directly electrically connected to the data lines. Alternatively, the source driver may be electrically connected to the data line through other structures.

A type of the source driver is not specifically limited, and for example, the source driver may be a COF (Chip On Film).

A specific way of binding the display panel and the source driver is not limited above. For example, the display panel and the source driver can be directly bound to each other. Alternatively, the display panel may be bound to the source driver through a FPC (Flexible Printed Circuit board).

Figure 3:
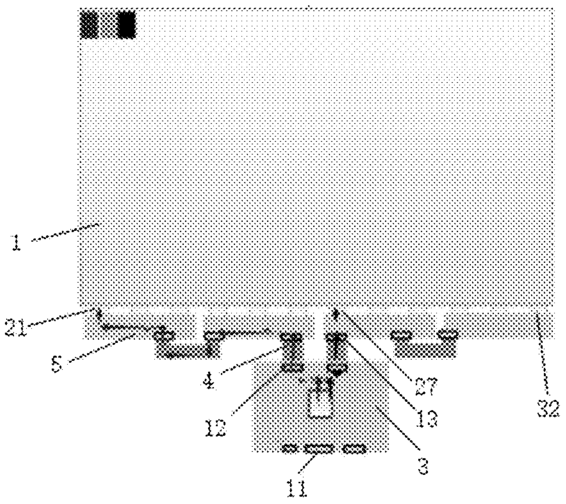
FIG. 3 is a schematic structural diagram of a display device in related art.

The data transmission start time of respective data lines is start time of image data signals received by respective data lines, and a transmission process of the image data signals is shown in FIG. 3.

Referring to FIG. 3, a front-end system (not shown in FIG. 3) is electrically connected to an interface 11 of a timing control unit 3, the timing control unit 3 is electrically connected to a flexible printed circuit board 4 through an interface 12, the flexible printed circuit board 4 is electrically connected to a printed circuit board 5 through an interface 13, and the printed circuit board 5 is electrically connected to a driver chip 21 to a driver chip 32, and the driver chip 21 to the driver chip 32 are arranged at and bound to a side of the display panel 1. FIG. 3 shows the driver chip 21 to the driver chip 32 being arranged in twelve rows from a left side to a right side of the display panel 1 as an example.

Referring to FIG. 3, the front-end system transmits the image data signals to the timing control unit 3 through the interface 11, the timing control unit 3 receives the image data signals and transmits them to the flexible printed circuit board 4 through the interface 12, the flexible printed circuit board 4 receives the image data signals and transmits them to the printed circuit board 5 through the interface 13, and the printed circuit board 5 transmits the image data signals to the driver chip 21 to the driver chip 32 respectively, and the driver chip 21 to the driver chip 32 transmit the image data signals to the display panel 1 for displaying.

Figure 4:
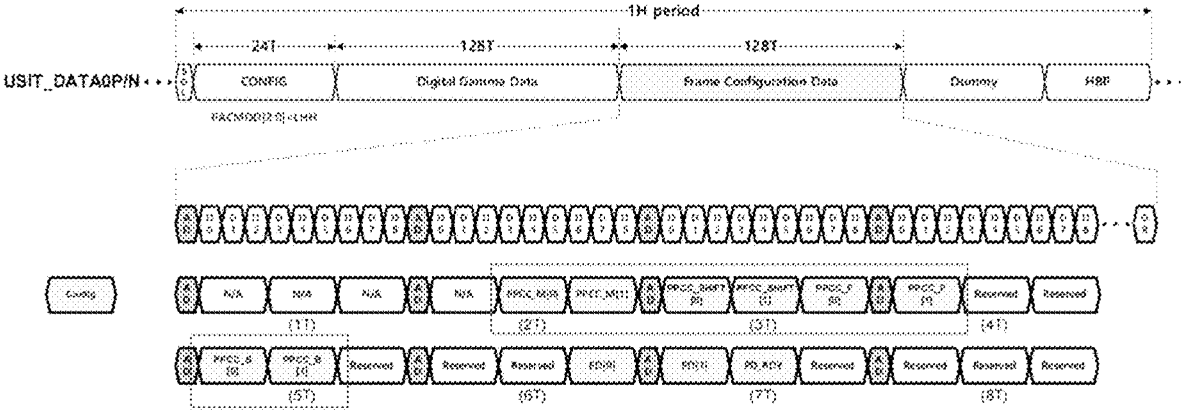
FIG. 4 is a schematic diagram of a USI-T protocol according to an embodiment of the present disclosure.

The image data signals can be transmitted according to a USI-T (Unified Standard Interface) protocol as shown in FIG. 4. Referring to FIG. 4, the USI-T protocol includes Frame Configuration Data, in which AD represents a flag bit, D0 to D8 represent data lines 0-8, and N/A represents an unused register, PPCC_M[0], PPCC_M[1], and PPCC_B[0] and PPCC_B[1] are all registers for setting multiple of delay or advance of the transmission start time of the image data signals, and PPCC_SHIFT[0] and PPCC_SHIFT[1] are registers for adjusting the data transmission start time of the data lines through different modes, where [0] represents a low level, [1] represents a high level, Reserved represents a reserved bit that can be used by either of the registers.

It should be noted that the image data signals can also be transmitted according to a CEDS (Clock Embedded Differential Signaling) protocol, which can be obtained according to related art and may not be repeatedly described in detail here.

Figure 5:
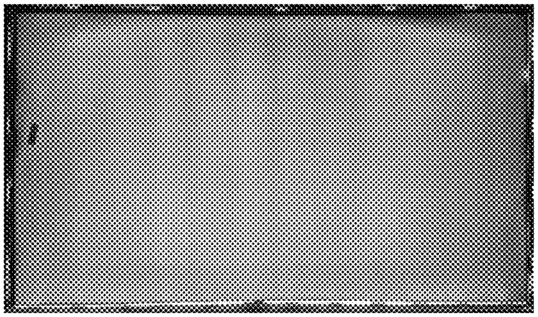
FIG. 5 is a schematic diagram of another display panel in related art with a V-Block problem.

FIG. 1 is a picture of a display device without charging compensation. It can be seen from FIG. 1 that there is a rather serious V-Block splitting-screen phenomenon, which is presented in each source driver IC with two dark sides and a bright middle of the display panel with an uneven brightness transition. The closer to the middle of the display panel, the larger the overall brightness. FIG. 5 is a picture of a better compensation mode that is turned on within an adjustable range in the related art. It can be seen from FIG. 5 that a middle area of the compensated display panel is slightly improved, but there are still an obvious black block and obvious vertical dark stripes on both sides.

Since effective charging time of a signal on a part of the gate lines away from the gate driver is shorter than that on a part of the gate lines close to the gate driver, when a data signal is input to the data lines through the source driver, an effective charging area between the data signal and the signal on the part of the gate lines close to the gate driver is larger than that of the data signal and the signal on the part of the gate lines away from the gate driver. Therefore, charging time of sub-pixels corresponding to the part of the gate lines away from the gate driver is shorter than that of sub-pixels corresponding to the part of the gate lines close to the gate driver, with large difference in charging effect, resulting in V-Block phenomenon. In the display device according to an embodiment of the present application, for a plurality of data lines intersecting a same gate line, the source driver is configured to set data transmission start time of respective data lines, that is, the data transmission start time of the respective data lines can be set to be different, for example, data transmission start time of data lines close to the gate driver can be set earlier than that of data lines away from the gate driver, and the data transmission start time of the data lines away from the gate driver can be set later than that of data lines close to the gate driver. Because the respective data lines and the gate line define different sub-pixels, data of the data lines close to the gate driver can be transmitted to their corresponding sub-pixels earlier than that of the data lines away from the gate driver, and the data of the data lines away from the gate driver can be transmitted to their corresponding sub-pixels later than that of the data lines close to the gate driver, so that effective charging time of respective sub-pixels formed by multiple data lines and the same gate line is the same, thus improving display effect and with good user experience.

Alternatively, the source driver includes a source driving unit.

The gate driver is configured to transmit a gate signal in a first preset time range to the gate line.

The source driving unit is configured to transmit data signals to the plurality of data lines. Any of a plurality of data lines intersecting a same gate line is taken as a first reference data line, and data transmission start time of the first reference data line is taken as reference time. In a case that among the plurality of data lines intersecting the same gate line, a gate signal on a gate line at an intersection with the first reference data line is transmitted earliest, data transmission start time of data lines except the first reference data line among the plurality of data lines is later than the reference time, so that effective charging time of respective sub-pixels formed by the plurality of data lines electrically connected to the source driving unit and the same gate line is the same. In a case that among the plurality of data lines intersecting the same gate line, the gate signal on the gate line at the intersection with the first reference data line is transmitted latest, data transmission start time of the data lines except the first reference data line among the plurality of data lines is earlier than the reference time, so that effective charging time of respective sub-pixels formed by the plurality of data lines electrically connected to the source driving unit and the same gate line is the same. In a case that among the plurality of data lines intersecting the same gate line, the gate signal on the gate line at the intersection with the first reference data line is transmitted midway, among the plurality of data lines, data transmission start time of a data line of which a data signal is transmitted earlier than the gate signal on the gate line at the intersection with the first reference data line is earlier than the reference time; and among the plurality of data lines, data transmission start time of a data line of which a data signal is transmitted later than the gate signal on the gate line at the intersection with the first reference data line is later than the reference time, so that the effective charging time of the respective sub-pixels formed by the plurality of data lines electrically connected to the source driving unit and the same gate line is the same.

FIG. 2 illustrates an example in which the source driver 2 includes one source driving unit located at a left end of the display panel 1. This can be taken as an example for source driving units located at other positions of the display panel, which will not be repeatedly described in detail here.

Here, a type of the source driving unit is not specifically limited. For example, the source driving unit may include a source driving chip, which may be a COF.

FIG. 2 shows an example in which the gate driver 6 is connected to three gate lines 81, 82 and 83, and the source driving unit is connected to four data lines 91, 92, 93 and 94, in which a gate signal on a gate line at an intersection with the data line 91 is transmitted earliest, a gate signal on a gate line at an intersection with the data line 94 is transmitted latest, and gate signals on gate lines at an intersection with the data lines 92 and 93 are transmitted later than the gate signal on the gate line at the intersection with the data line 91 and earlier the gate signal on the gate line at the intersection with the data line 94. The gate driver is configured to transmit gate signals in a first preset time range to the gate lines 81, 82 and 83. The source driving unit is configured to transmit data signals to the data lines 91, 92, 93 and 94.

It should be noted that the gate signals are configured to control respective sub-pixels to turn on. The first preset time range is a duration range of gate signal transmission on the gate line, and is not specifically limited, and can be determined according to a refresh frequency. For example, the first preset time range can be at a microsecond level.

In the following, the data lines 91, 92, 93 and 94 intersecting the gate line 81 will be described as an example, and data transmission of the data lines 91, 92, 93 and 94 intersecting the gate lines 82 and 83 is similar to this, and will not be repeatedly described in detail here.

In a case that among the data lines 91, 92, 93 and 94, the first reference data line is the data line 91 with its data transmission starting time as the reference time, data transmission starting time of the data lines 92, 93 and 94 is later than the reference time because gate signals on the gate line 81 at the intersections with the data lines 92, 93 and 94 are all transmitted later than the gate signal on the gate line 81 at the intersection with the data line 91, so as to ensure that the data signals of the data lines 91, 92, 93 and 94 are not transmitted to the sub-pixels of the display panel at the same time, and specifically, the data signals of the data lines 91, 92, 93 and 94 are transmitted to the sub-pixels P1, P2, P3 and P4 sequentially with a delay.

In a case that among the data lines 91, 92, 93 and 94, the first reference data line is the data line 94 with its data transmission starting time as the reference time, data transmission starting time of the data lines 91, 92 and 93 is earlier than the reference time because the gate signals on the gate line 81 at the intersections with the data lines 91, 92 and 93 are all transmitted earlier than the gate signal on the gate line 81 at the intersection with the data line 94, so as to ensure that the data signals of the data lines 91, 92, 93 and 94 are not transmitted to the sub-pixels of the display panel at the same time, and specifically, the data signals of the data lines 91, 92, 93 and 94 are transmitted to the sub-pixels P1, P2, P3 and P4 sequentially in advance.

In a case that among the data lines 91, 92, 93 and 94, the first reference data line is the data line 92 with its data transmission starting time as the reference time, the data transmission start time of the data line 91 is earlier than the reference time because the gate signal on the gate line 81 at the intersection with the data line 91 is transmitted earlier than the gate signal on the gate line 81 at the intersection with the data line 92; and the data transmission start time of the data lines 93 and 94 is later than the reference time because the gate signals on the gate line 81 at the intersections with the data lines 93 and 94 are transmitted earlier than the gate signal on the gate line 81 at the intersection with the data line 92, thus ensuring that the data signals of the data lines 91, 92, 93 and 94 are not transmitted to the sub-pixels of the display panel at the same time. Specifically, the data signal of the data line 91 is transmitted to a sub-pixel P1 in advance, then the data signal of the data line 92 is transmitted to a sub-pixel P2, then the data signal of the data line 93 is transmitted to a sub-pixel P3 with a delay, and finally the data signal of data line 94 is transmitted to a sub-pixel P4 with a delay. The data signal of the data line 94 is transmitted to the sub-pixel with a delay over the data signal of the data line 93.

In a case that among the data lines 91, 92, 93 and 94, the first reference data line is the data line 93 with its data transmission starting time as the reference time, the data transmission start time of the data lines 91 and 92 is earlier than the reference time because gate signals on the gate line 81 at the intersection with the data lines 91 and 92 are transmitted earlier than the gate signal on the gate line 81 at the intersection with the data line 93; and the data transmission start time of the data line 93 is later than the reference time because the gate signal on the gate line 81 at the intersection with the data line 94 is transmitted earlier than the gate signal on the gate line 81 at the intersection with the data line 93, thus ensuring that the data signals of the data lines 91, 92, 93 and 94 are not transmitted to the sub-pixels of the display panel at the same time. Specifically, the data signal of the data line 91 is transmitted to a sub-pixel P1 in advance, then the data signal of the data line 92 is transmitted to a sub-pixel P2 in advance, then the data signal of the first data line 93 is transmitted to a sub-pixel P3, and finally the data signal of data line 94 is transmitted to a sub-pixel P4 with a delay. The data signal of the data line 91 is transmitted to the sub-pixel in advance over the data signal of the data line 92.

It is not specifically limited that the data transmission start time is earlier than the reference time or later than the reference time. For example, the data transmission start time can be earlier than the reference time by 2 UI (Unit Delay), or later than the reference time by 4 UI.

It should be noted that a case for any number of data lines and gate lines can be analogized, which will not be repeatedly described in detail here.

The data transmission start time can be realized by GDE/PPCC compensation.

The data transmission start time can be in three modes, namely, a first mode (V-Shift mode), a second mode (L-Shift mode) and a third mode (R-Shift mode). The three modes are illustrated by taking the data lines 91, 92, 93 and 94 shown in FIG. 2 as an example. Specifically, in the V-Shift mode, the data transmission start times of the data lines 91 and 94 shown in FIG. 2 are the same, and the data transmission start times of the data lines 92 and 93 are the same. In the L-Shift mode, the data transmission start time of the data lines 91, 92, 93 and 94 shown in FIG. 2 increase sequentially. In the R-Shift mode, the data transmission start time of the data lines 94, 93, 92 and 91 shown in FIG. 2 increase sequentially. A case for other numbers of data lines can be analogized, which will not be repeatedly described in detail here.

Unit delay time and multiple that the data transmission start time can be earlier than the reference time can be any value, such as 1 UI, 2 UI, 3 UI, etc. Considering practical applications, the data transmission start time can be earlier than the reference time by 2 UI, 4 UI, 6 UI and 8 UI, which can be multiplied by delay multiples of 1, 2, 3 or 4 respectively. For example, 8 UI, 16 UI, 24 UI and 32 UI can be obtained by multiplying 8 UI with the delay multiples of 1, 2, 3 or 4.

In the display device according to the embodiment of the present application, by setting the data transmission start time of different data lines in one source driving unit to be adjustable, the V-Block problem caused by uneven impedance change in some areas in the source driving unit, transmission delays of the gate signals on the gate lines at the intersections with different data lines and the like can be well improved, thus improving adjustment flexibility and compensation degree.

Alternatively, all of the data lines include a plurality of first data line groups, and each first data line group includes a plurality of data lines.

The source driving unit is configured to take any of the plurality of first data line groups intersecting the same gate line as a first reference data line group, and take data transmission start time of the first reference data line group as the reference time.

In a case that among the plurality of first data line groups intersecting the same gate line, a gate signal on the gate line at an intersection with the first reference data line group is transmitted earliest, data transmission start time of first data line groups except the first reference data line group among the plurality of first data line groups is later than the reference time, so that effective charging time of respective sub-pixels formed by data lines in the plurality of first data line groups electrically connected to the source driving unit and the same gate line is the same. In a case that among the plurality of first data line groups intersecting the same gate line, the gate signal on the gate line at the intersection with the first reference data line group is transmitted latest, data transmission start time of the first data line groups except the first reference data line group among the plurality of first data line groups is earlier than the reference time, so that effective charging time of respective sub-pixels formed by data lines in the plurality of first data line groups electrically connected to the source driving unit and the same gate line is the same. In a case that among the plurality of first data line groups intersecting the same gate line, the gate signal on the gate line at the intersection with the first reference data line group is transmitted midway, among the plurality of first data line groups, data transmission start time of a first data line group of which a data signal is transmitted earlier than the gate signal on the gate line at the intersection with the first reference data line group is earlier than the reference time; and among the plurality of first data line groups, data transmission start time of a first data line group of which a data signal is transmitted later than the gate signal on the gate line at the intersection with the first reference data line group is later than the reference time, so that effective charging time of respective sub-pixels formed by data lines in the plurality of first data line groups electrically connected to the source driving unit and the same gate line is the same.

Figure 6:
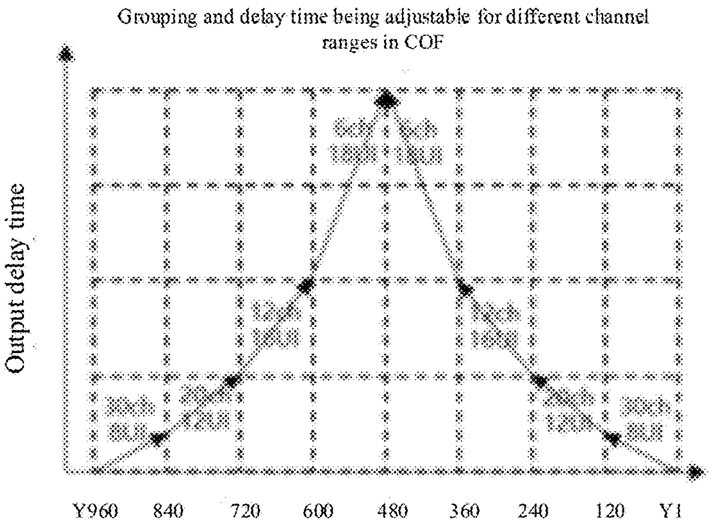
FIG. 6 is a schematic diagram of delay time of a data line in a source driving unit according to an embodiment of the present disclosure.

FIG. 6 shows an example in which the display device includes 960 data lines, where the abscissa of FIG. 6 represents the data line, the ordinate represents output delay time in a unit of UI. Referring to FIG. 6, 960 data lines are divided into eight first data line groups, and each first data line group includes 120 data lines. Specifically, the 960 data lines include a first data line group composed of data lines Y1-120, a first data line group composed of data lines Y121-240, a first data line group composed of data lines Y241-360, a first data line group composed of data lines Y361-480, a first data line group composed of data lines Y600-481, a first data line group composed of data lines Y720-601, a first data line group composed of data lines Y840-721, and a first data line group composed of data lines Y960-841.

In the first data line groups Y1-120, Y121-240, Y241-360, Y361-480, Y600-481, Y720-601, Y840-721 and Y960-841, the first reference data line groups are the first data line groups Y1-120 and Y960-841 with their data transmission start time as the reference time. Data transmission start time of the first data line groups Y121-240, Y241-360, Y361-480, Y600-481, Y720-601 and Y840-721 are all later than the reference time, thus ensuring that data signals of the eight first data line groups are not transmitted to the sub-pixels of the display panel at the same time. Specifically, data signals of the first data line groups Y1-120 and Y960-841 are transmitted to the sub-pixels, and then data signals of the first data line groups Y121-240, Y241-360, Y361-480, Y600-481, Y720-601 and Y840-721 are transmitted to the sub-pixels with a delay. For the six first data line groups, the data signals of the first data line groups Y121-240 and Y840-721 are transmitted to the sub-pixels, followed by the data signals of the first data line groups Y241-360 and Y720-601, and finally the data signals of the first data line groups Y361-480 and Y600-481 are transmitted to the sub-pixels.

In the first data line groups Y1-120, Y121-240, Y241-360, Y361-480, Y600-481, Y720-601, Y840-721 and Y960-841, the first reference data line groups are the first data line groups Y361-480 and Y600-481 with their data transmission start time as the reference time. Data transmission start time of the first data line groups Y1-120, Y121-240, Y241-360, Y720-601, Y840-721 and Y960-841 are all earlier than the reference time, thus ensuring that data signals of the eight first data line groups are not transmitted to the sub-pixels of the display panel at the same time. Specifically, data signals of the first data line groups Y1-120, Y121-240, Y241-360, Y720-601, Y840-721 and Y960-841 are transmitted to the sub-pixels in advance, and then data signals of the first data line groups Y361-480 and Y600-481 are transmitted to the sub-pixels. For the six first data line groups, the data signals of the first data line groups Y1-120 and Y960-841 are transmitted to the sub-pixels, then the data signals of the first data line groups Y121-240 and Y840-721 are transmitted to the sub-pixels, and finally the data signals of the first data line groups Y241-360 and Y720-601 are transmitted to the sub-pixels.

In the first data line groups Y1-120, Y121-240, Y241-360, Y361-480, Y600-481, Y720-601, Y840-721 and Y960-841, the first reference data line groups are the first data line groups Y121-240 and Y840-721 with their data transmission start time as the reference time. Data transmission start time of the first data line groups Y1-120 and Y960-841 are both earlier than the reference time, thus ensuring that data signals of the first data line groups Y1-120 and Y960-841 are transmitted to the sub-pixels of the display panel in advance; and data transmission start time of the first data line groups Y241-360, Y361-480, Y600-481 and Y720-601 are all later than the reference time, thus ensuring that data signals of the first data line groups Y241-360, Y361-480, Y600-481 and Y720-601 are transmitted to the sub-pixels of the display panel with a delay.

In the first data line groups Y1-120, Y121-240, Y241-360, Y361-480, Y600-481, Y720-601, Y840-721 and Y960-841, the first reference data line groups are the first data line groups Y241-360 and Y720-601 with their data transmission start time as the reference time. Data transmission start time of the first data line groups Y1-120, Y241-360, Y840-721 and Y960-841 are both earlier than the reference time, thus ensuring that data signals of the first data line groups Y1-120, Y241-360, Y840-721 and Y960-841 are transmitted to the sub-pixels of the display panel in advance; and data transmission start time of the first data line groups Y361-480 and Y600-481 are both later than the reference time, thus ensuring that data signals of the first data line groups Y361-480 and Y600-481 are transmitted to the sub-pixels of the display panel with a delay.

It should be noted that an expression "ch" in FIG. 6 represents a channel (i.e., a data line).

In the display device according to the embodiment of the present application, all of data lines in one source driving unit are divided into a plurality of first data line groups, and the data transmission start time of the plurality of first data line groups is set to be adjustable, the V-Block problem caused by uneven impedance change in some areas in the source driving unit, transmission delays of the gate signals on the gate lines at the intersections with different data lines and the like can be well improved, thus improving adjustment flexibility and compensation degree.

Alternatively, a quotient of the number of all of data lines and the number of all of the first data line groups is an integer, and a number of the data lines in each first data line group is the same. In this way, it facilitates practical applications.

The number of all of data lines and the number of all of first data line groups are not specifically limited. For example, the number of all of data lines can be 960 and the number of all of first data line groups can be 8, so that the quotient of the number of all of data lines and the number of all of first data line groups is 120, that is, the number of data lines in each first data line group is 120. Other numbers of all of data lines and all of first data line groups can be analogized, which will not be repeatedly described in detail here.

Certainly, it is also possible to set the numbers of data lines in each first data line group to be different, which is not specifically limited here.

Alternatively, the source driving unit is configured such that all of data lines in each first data line group include a plurality of first sub-data line groups, and each of the first sub-data line groups include at least one data line; and any of a plurality of first sub-data line groups intersecting the same gate line is taken as a second reference data line group, and data transmission start time of the second reference data line group is taken as a reference time.

In a case that among the plurality of first sub-data line groups intersecting the same gate line, a gate signal on a gate line at an intersection with the second reference data line group is transmitted earliest, data transmission start time of first sub-data line groups except the second reference data line group among the plurality of first sub-data line groups is later than the reference time, so that effective charging time of respective sub-pixels formed by data lines in the plurality of first sub-data line groups electrically connected to the source driving unit and the same gate line is the same. In a case that among the plurality of first sub-data line groups intersecting the same gate line, the gate signal on the gate line at the intersection with the second reference data line group is transmitted latest, data transmission start time of the first sub-data line groups except the second reference data line group among the plurality of first sub-data line groups is earlier than the reference time, so that effective charging time of respective sub-pixels formed by data lines in the plurality of first sub-data line groups electrically connected to the source driving unit and the same gate line is the same. In a case that among the plurality of first sub-data line groups intersecting the same gate line, the gate signal on the gate line at the intersection with the second reference data line group is transmitted midway, among the plurality of first sub-data line groups, data transmission start time of a first sub-data line group of which a data signal is transmitted earlier than the gate signal on the gate line at the intersection with the second reference data line group is earlier than the reference time; and among the plurality of first sub-data line groups, data transmission start time of a first sub-data line group of which a data signal is transmitted later than the gate signal on the gate line at the intersection with the second reference data line group is later than the reference time, so that effective charging time of respective sub-pixels formed by data lines in the plurality of first sub-data line groups electrically connected to the source driving unit and the same gate line is the same.

A number of the first sub-data line groups included in all of data lines in the first data line groups is not specifically limited, and for example, the number of first sub-data line groups included in all of data lines in the first data line groups may be two, three, four, and so on. Further alternatively, the number of the first sub-data line groups can be divisible by the number of all of data lines in each first data line group.

A number of data lines included in the first sub-data line group is not specifically limited. For example, the number of data lines included in the first sub-data line group may be one, two, three and so on.

The display device shown in FIG. 6 includes 960 data lines, which are divided into eight first data line groups, and specifically the first data line groups Y1-120, Y121-240, Y241-360, Y361-480, Y600-481, Y720-601, Y840-721 and Y960-841 are taken for illustration.

For example, 120 data lines in the first data line group Y1-120 can be divided into four first sub-data line groups, that is, each of the first sub-data line groups include 30 data lines, that is, the first data line group Y1-120 includes first sub-data line groups Y1-30, Y31-60, Y61-90 and Y91-120.

In the first sub-data line groups Y1-30, Y31-60, Y61-90 and Y91-120, the second reference data line group is the first sub-data line group Y1-30 with its data transmission start time as the reference time, data transmission start time of the first sub-data line groups Y31-60, Y61-90 and Y91-120 is later than the reference time, thus ensuring that data signals of the four first sub-data line groups are not transmitted to the sub-pixels of the display panel at the same time. Specifically, the data signals of the first sub-data line groups Y31-60, Y61-90 and Y91-120 are transmitted to the sub-pixels with a delay.

In the first sub-data line groups Y1-30, Y31-60, Y61-90 and Y91-120, the second reference data line group is the first sub-data line group Y91-120 with its data transmission start time as the reference time, data transmission start time of the first sub-data line groups Y1-30, Y31-60 and Y61-90 is earlier than the reference time, thus ensuring that data signals of the four first sub-data line groups are not transmitted to the sub-pixels of the display panel at the same time. Specifically, the data signals of the first sub-data line groups Y1-30, Y31-60 and Y61-90 are transmitted to the sub-pixels in advance.

In the first sub-data line groups Y1-30, Y31-60, Y61-90 and Y91-120, the second reference data line group is the first sub-data line group Y31-60 with its data transmission start time as the reference time, data transmission start time of the first sub-data line group Y1-30 is earlier than the reference time, thus ensuring that data signals of the four first sub-data line groups are not transmitted to the sub-pixels of the display panel at the same time, and specifically, a data signal of the first sub-data line group Y1-30 is transmitted to the sub-pixels in advance; and data transmission start time of the first sub-data line groups Y61-90 and Y91-120 is both later than the reference time, thus ensuring that the data signals of the four first sub-data line groups are not transmitted to the sub-pixels of the display panel at the same time, and specifically, data signals of the first sub-data line groups Y61-90 and Y91-120 are transmitted to the sub-pixels with a delay.

In the first sub-data line groups Y1-30, Y31-60, Y61-90 and Y91-120, the second reference data line group is the first sub-data line group Y61-90 with its data transmission start time as the reference time, data transmission start time of the first sub-data line groups Y1-30 and Y31-60 is earlier than the reference time, thus ensuring that data signals of the four first sub-data line groups are not transmitted to the sub-pixels of the display panel at the same time, and specifically, data signals of the first sub-data line group Y1-30 and Y31-60 are transmitted to the sub-pixels in advance; and data transmission start time of the first sub-data line groups Y91-120 is later than the reference time, thus ensuring that the data signals of the four first sub-data line groups are not transmitted to the sub-pixels of the display panel at the same time, and specifically, a data signal of the first sub-data line group Y91-120 is transmitted to the sub-pixels with a delay.

In the display device according to the embodiment of the present application, all of data lines in one source driving unit are divided into a plurality of first data line groups, and then each first data line group is divided into a plurality of first sub-data line groups, and the data transmission start time of the plurality of first data line groups is set to be adjustable, the V-Block problem caused by uneven impedance change in some areas in the source driving unit, transmission delays of the gate signals on the gate lines at the intersections with different data lines and the like can be well improved, thus improving adjustment flexibility and compensation degree.

Alternatively, data transmission start time of all of the data lines in each first sub-data line group is the same. Thus, it is easy to set and simple and easy to realize.

Alternatively, the plurality of first sub-data line groups are arranged in a direction away from the gate driver sequentially. The source driving unit is configured to take any of the plurality of first sub-data line groups intersecting the same gate line as a third reference data line group, and take data transmission start time of the third reference data line group as the reference time.

In a case that among the plurality of first sub-data line groups intersecting the same gate line, the third reference data line group is located closest to the gate driver, data transmission start time of first sub-data line groups except the third reference data line group among the plurality of first sub-data line groups is later than the reference time, so that effective charging time of respective sub-pixels formed by data lines in the plurality of first sub-data line groups electrically connected to the source driving unit and the same gate line is the same. In a case that among the plurality of first sub-data line groups intersecting the same gate line, the third reference data line group is located farthest from the gate driver, data transmission start time of the first sub-data line groups except the third reference data line group among the plurality of first sub-data line groups is earlier than the reference time, so that effective charging time of respective sub-pixels formed by data lines in the plurality of first sub-data line groups electrically connected to the source driving unit and the same gate line is the same. In a case that among the plurality of first sub-data line groups intersecting the same gate line, the third reference data line group is located in the middle of a distance from the gate driver, among the plurality of first sub-data line groups data transmission start time of a first sub-data line group, which is closer to the gate driver than the third reference data line group is earlier than the reference time; and among the plurality of first sub-data line groups, data transmission start time of a first sub-data line group which is farther from the gate driver than the third reference data line group is later than the reference time, so that effective charging time of respective sub-pixels formed by data lines in the plurality of first sub-data line groups electrically connected to the source driving unit and the same gate line is the same.

Figure 7:
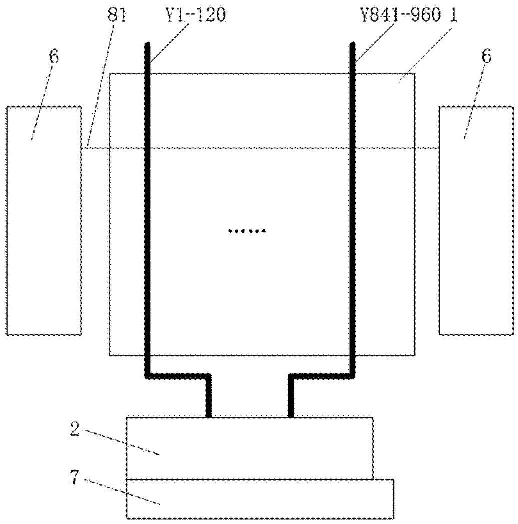
FIG. 7 is a schematic structural diagram of another display device according to an embodiment of the present disclosure.

Referring to FIG. 6 and FIG. 7, the first data line groups Y1-120, Y121-240, Y241-360, Y361-480, Y600-481, Y720-601, Y840-721 and Y960-841 are arranged in a direction away from the gate driver 6 at a left side of the display panel 1. Alternatively, the first data line groups Y960-841, Y840-721, Y720-601, Y600-481, Y361-480, Y241-360, Y121-240 and Y1-120 are arranged in a direction away from the gate driver 6 at a right side of the display panel 1. That is, a distance of the first data line group Y1-120 from the gate driver 6 at the left side of the display panel 1 is the same as a distance of the first data line group Y960-841 from the gate driver 6 at the right side of the display panel 1, and cases for other first data line groups can be analogized. On this basis, the first sub-data line groups Y1-30, Y31-60, Y61-90 and Y91-120 are arranged in a direction away from the gate driver 6 at the left side of the display panel 1.

In the first sub-data line groups Y1-30, Y31-60, Y61-90 and Y91-120, the third reference data line group is the first sub-data line group Y1-30 with its data transmission start time as the reference time, data transmission start time of the first sub-data line groups Y31-60, Y61-90 and Y91-120 is later than the reference time, thus ensuring that data signals of the four first sub-data line groups are not transmitted to the sub-pixels of the display panel at the same time. Specifically, the data signals of the first sub-data line groups Y31-60, Y61-90 and Y91-120 are transmitted to the sub-pixels with a delay.

In the first sub-data line groups Y1-30, Y31-60, Y61-90 and Y91-120, the third reference data line group is the first sub-data line group Y91-120 with its data transmission start time as the reference time, data transmission start time of the first sub-data line groups Y1-30, Y31-60 and Y61-90 is earlier than the reference time, thus ensuring that data signals of the four first sub-data line groups are not transmitted to the sub-pixels of the display panel at the same time. Specifically, the data signals of the first sub-data line groups Y1-30, Y31-60 and Y61-90 are transmitted to the sub-pixels in advance.

In the first sub-data line groups Y1-30, Y31-60, Y61-90 and Y91-120, the third reference data line group is the first sub-data line group Y31-60 with its data transmission start time as the reference time, data transmission start time of the first sub-data line group Y1-30 is earlier than the reference time, thus ensuring that data signals of the four first sub-data line groups are not transmitted to the sub-pixels of the display panel at the same time, and specifically, a data signal of the first sub-data line group Y1-30 is transmitted to the sub-pixels in advance; and data transmission start time of the first sub-data line groups Y61-90 and Y91-120 is both later than the reference time, thus ensuring that the data signals of the four first sub-data line groups are not transmitted to the sub-pixels of the display panel at the same time, and specifically, data signals of the first sub-data line groups Y61-90 and Y91-120 are transmitted to the sub-pixels with a delay.

In the first sub-data line groups Y1-30, Y31-60, Y61-90 and Y91-120, the third reference data line group is the first sub-data line group Y61-90 with its data transmission start time as the reference time, data transmission start time of the first sub-data line groups Y1-30 and Y31-60 is earlier than the reference time, thus ensuring that data signals of the four first sub-data line groups are not transmitted to the sub-pixels of the display panel at the same time, and specifically, data signals of the first sub-data line group Y1-30 and Y31-60 are transmitted to the sub-pixels in advance; and data transmission start time of the first sub-data line groups Y91-120 is later than the reference time, thus ensuring that the data signals of the four first sub-data line groups are not transmitted to the sub-pixels of the display panel at the same time, and specifically, a data signal of the first sub-data line group Y91-120 is transmitted to the sub-pixels with a delay.

Alternatively, all of the data lines intersecting the same gate line include M first data line groups, and the M first data line groups are sorted in the direction away from the gate driver sequentially. In the first mode, among the M first data line groups, a number of data lines in a first data line group of an N-th sequence is the same as that in a first data line group of an (M−N+1)-th sequence, both of which are even numbers, where M is an even number greater than or equal to 2 and N is an integer greater than or equal to 1.

The first mode is the V-Shift mode.

In the following, an example is illustrated in which a number of all of data lines intersecting the same gate line is 960, M is 8, and N is 1. As shown in FIG. 6 and FIG. 7, 960 data lines include first data line groups Y1-120, Y121-240, Y241-360, Y361-480, Y600-481, Y720-601, Y840-721 and Y960-841. A number of data lines in a first data line group of a $1^{st}$ sequence is the same as that in a first data line group of an 8-th sequence, a number of data lines in a first data line group of a $2^{nd}$ sequence is the same as that in a first data line group of a 7-th sequence, a number of data lines in a first data line group of a $3^{rd}$ sequence is the same as that in a first data line group of a 6-th sequence, and a number of data lines in a first data line group of a 4-th sequence is the same as that in a first data line group of a 5-th sequence, the numbers are all 120.

Alternatively, in the direction away from the gate driver, data transmission start time of respective first data line groups increases sequentially. Thus, it is easy to set and simple and easy to realize.

Alternatively, each of the plurality of first data line groups intersecting the same gate line includes an even number of first sub-data line groups; and in the direction away from the gate driver, a number of the first sub-data line groups in each first data line group increases sequentially. Thus, it is easy to set and simple and easy to realize.

Alternatively, in the direction away from the gate driver, data transmission start time of a first sub-data line group in respective first data line groups is sequentially increased by a same multiple. Thus, it is easy to set and simple and easy to realize.

With reference to FIG. 6 and FIG. 7, an example is illustrated in which 960 data lines are divided into eight first data line groups, and 960 data lines adopt the V-Shift mode (that is, Y480/Y481 are data lines that transmit data last).

For the first data line group Y1-120 and the first data line group Y960-841, every 30 data lines constitute a first sub-data line group, and data transmission start time is delayed by 8 UI which is then multiplied by 1 between two first sub-data line groups, that is, a delay between two first sub-data line groups is 8 UI. In this way, the data transmission start time of the first data line group Y1-120 is delayed by 32 UI, and the data transmission start time of the first data line group Y960-721 is delayed by 32 UI.

For the first data line group Y121-240 and the first data line group Y840-721, every 20 data lines constitute a first sub-data line group, and data transmission start time is delayed by 6 UI which is then multiplied by 2 between two first sub-data line groups, that is, a delay between two first sub-data line groups is 12 UI. In this way, the data transmission start time of the first data line group Y121-240 is delayed by 72 UI, and the data transmission start time of the first data line group Y840-721 is delayed by 72 UI.

For the first data line group Y241-360 and the first data line group Y720-601, every 12 data lines constitute a first sub-data line group, and data transmission start time is delayed by 8 UI which is then multiplied by 2 between two first sub-data line groups, that is, a delay between two first sub-data line groups is 16 UI. In this way, the data transmission start time of the first data line group Y241-360 is delayed by 160 UI, and the data transmission start time of the first data line group Y720-601 is delayed by 160 UI.

For the first data line group Y361-480 and the first data line group Y600-481, every 6 data lines constitute a first sub-data line group, and data transmission start time is delayed by 6 UI which is then multiplied by 3 between two first sub-data line groups, that is, a delay between two first sub-data line groups is 18 UI. In this way, the data transmission start time of the first data line group Y361-480 is delayed by 360 UI, and the data transmission start time of the first data line group Y600-481 is delayed by 360 UI.

Figure 8:
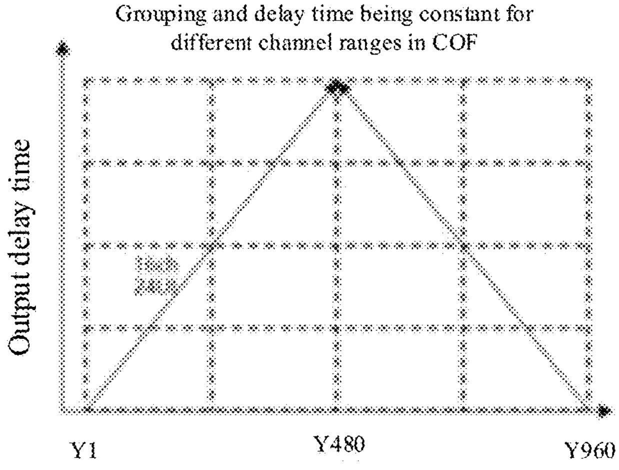
FIG. 8 is a schematic diagram of delay time of a data line in a source driving unit in related art.

In the related art, for example, when V-Shift adjustment is performed on 960 data lines as shown in FIG. 8, as shown in FIG. 8, delay time adjustment for each data line is fixed and uniform, and grouping of the delay time in the whole source driving unit is also fixed. However, due to uneven impedance difference among respective data lines in the display device (impedance of a data line located in a middle of the display panel is small, and impedance gradually increases from the data line located in the middle of the display panel towards a data line located at both ends of the display panel), there is still a problem that impedance is properly uniform in a large area but the Block in a small area is still not improved after adjustment, as shown in FIG. 5. As shown in FIG. 5, after optimizing the adjustment of the Block in the middle area, there is still an obvious black Block near data lines Y1 and Y960 that cannot be solved due to excessive impedance, and a problem of uneven brightness still exists in a horizontal direction of the source electrode driving unit.

In view of the above problems, for example, when the display device according to the embodiment of the present application adopts the V-Shift mode, a multi-group adjustable scheme is adopted. For example, 960 data lines can be divided into eight first data line groups, and 120 data lines in each first data line group can be divided into four first sub-data line groups. For example, 6/12/20/30 data lines can be selected into a group, so that delay time of every 120 data lines can be adjusted to be nonuniformly transitioned to another. That is to say, in this disclosure, by setting a mode in which delay time in different channel ranges in the source driving unit is grouped, the delay time is adjustable, and the data line Y1ch/Y960 is used as a starting point, a problem of being over-dark or over-bright in a certain area caused by uneven impedance change in some areas in the source driving unit, transmission delays of the gate signals on the gate lines at the intersections with different data lines and the like can be well improved, thus improving adjustment flexibility and compensation degree.

Alternatively, the source driver includes a plurality of source driving units.

The gate driver is configured to transmit a gate signal in a first preset time range to the gate line.

The plurality of data lines are divided into a plurality of groups, and each source driving unit is electrically connected to one group of the data lines. Any of the plurality of source driving units is taken as a reference source driving unit, and rest of the source driving units except the reference source driving unit are adjusting source driving units. Any data line in the plurality of groups of data lines intersecting the same gate line electrically connected to the reference source driving unit is taken as a second reference data line, and data transmission start time of the second reference data line is taken as a reference time. One of data lines electrically connected to the reference source drive unit closest to an adjacent adjusting source drive unit is a first data line, and a data line in the adjusting source drive unit closest to the reference source drive unit is a second data line.

In a case that among the plurality of groups of the data lines intersecting the same gate line, a gate signal on a gate line at an intersection with the second reference data line is transmitted earliest, data transmission start time of the first data line is later than the reference time, and the data transmission start time of the first data line is the same as that of the second data line, so that effective charging time of respective sub-pixels formed by data lines in the plurality of groups of data lines electrically connected to the source driving unit and the same gate line is the same.

Here, a number of source driving units included in the source driver is not specifically limited. For example, the source driver may include two source driving units. Alternatively, the source driver may include three or more source driving units.

Here, a number of groups into which the data lines are divided is not specifically limited. For example, the data lines can be divided into two groups; of course, the data lines can also be divided into three or more groups, which can be determined according to the number of source driving units.

Figure 9:
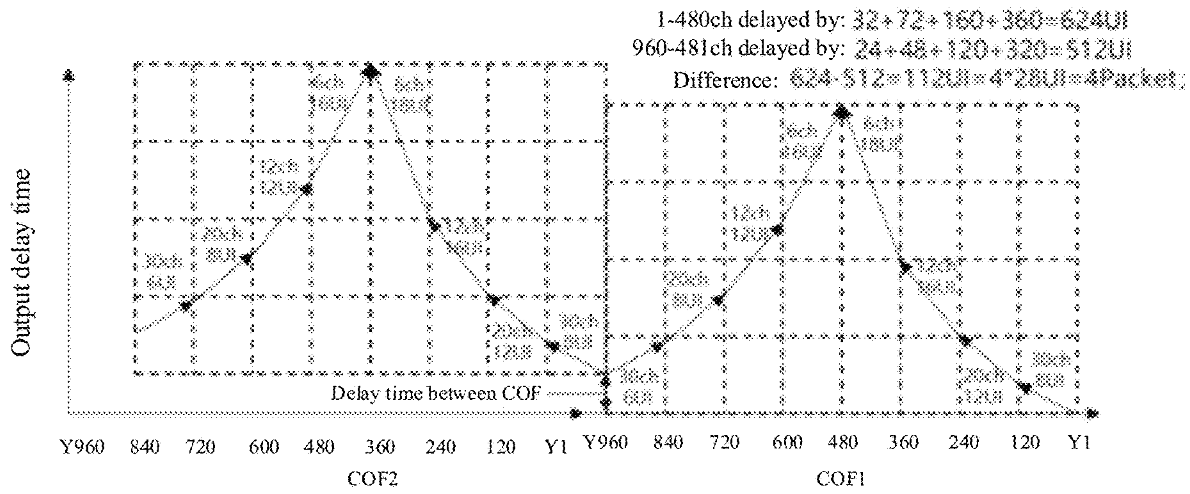
FIG. 9 is a schematic diagram of delay time of a data line between adjacent source driving units according to an embodiment of the present disclosure.

FIG. 9 shows an example in which the display device includes two source driving units, namely COF1 and COF2, and each COF includes 960 data lines. Referring to FIG. 9, COF1 is adopted as a reference source driving unit, and COF2 is adopted an adjusting source driving unit. In COF1, in a case that the second reference data line is a data line Y1 with its data transmission start time as the reference time, the first data line is a data line Y960 in COF1 and the second data line is a data line Y1 in COF2. In a case that among data lines Y1-960 in COF1 and data lines Y1-960 in COF2, the second reference data line is a data line Y1 in COF1 with its data transmission start time as the reference time, data transmission start time of data lines Y2-960 in COF1 and data lines Y1-960 in COF2 is later than the reference time, and data transmission start time of a data line Y960 in COF1 and a data line Y1 in COF2 is the same, and the data transmission start time of the data lines Y2-960 in COF2 is later than that of the data line Y1 in COF2, thus ensuring that data signals of all of data lines in COF1 and COF2 are not transmitted to the display at the same time.

Figure 10:
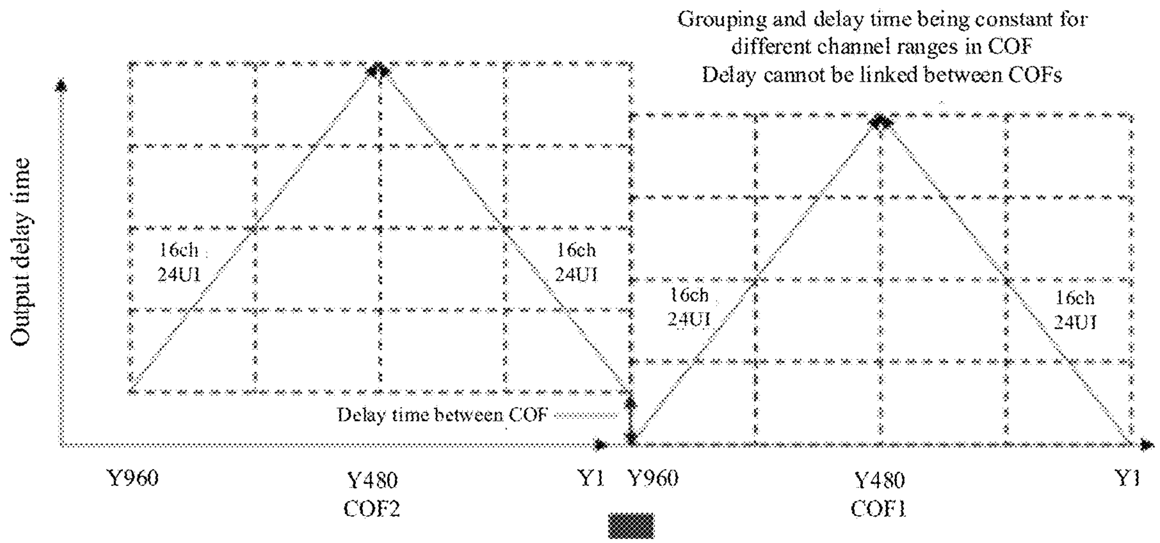
FIG. 10 is a schematic diagram of delay time of a data line between adjacent source driving units in related art.

Delay of gate signals on gate lines of a large-size display panel in a horizontal direction results in better charging for pixels closer to the middle of the display panel, and delay often needs to be set to be larger for a COF closer to the middle of the display panel. When one whole delay time is set among COFs, brightness difference may occur between Y1 and Y960 in two adjacent COFs due to this delay setting, and delay between COFs cannot be effectively linked, so charging difference of the display panel also lies between the source driving units, namely between COFs. In the related art, for example, when a plurality of COFs are driven in the V-Shift mode, as shown in FIG. 10, due to the Delay setting between COF1 and COF2, that is, it is provided that the data lines Y1 and Y960 start outputting simultaneously, and data lines Y480 and Y481 need to ensure simultaneous outputting at a last moment, which results in inability to adjustment for data lines Y1-480 and Y960-481 for different Delay modes. At this time, combined with the overall Delay between COF1 and COF2, a bright-dark dividing line is easy to be formed at a border between COF1 and COF2, and the Delay cannot be effectively linked between COF1 and COF2.

In view of the above problems, a display device is provided in an embodiment of the present disclosure, in which one of the data lines Y1 and Y960 is selected as a starting point (1ch in COF1 is taken as the starting point in FIG. 9), and the other of the data lines Y1 and Y960 is Delayed relative to the starting point to realize delay matching between COF1 and COF2. Specifically, as shown in FIG. 4, 1ch is selected as the starting point for outputting in COF1, assuming that data lines Y1-480 in COF1 are totally delayed by 624 UI and data lines Y960-481 in COF1 are totally delayed by 512 UI (here, Delay time for data lines Y1-480 and Y960-481 in COF1 need to be different), starting output time of the data line Y960 in COF1 is adjusted to be delayed by 240 UI relative to starting output time of the data line Y1. At this time, when COF2 is delayed by 240 UI relative to COF1, the data line Y960 in COF1 and the data line Y1 in COF2 output at the same time, which can effectively improve a problem that the bright-dark dividing line is easy to be formed at the border between COFs and the Delay cannot be effectively linked between COFs, with a more flexible and effective compensation setting model.

It should be noted that Delay time of the data lines Y1-480 and Y960-481 in COF1 depends on the Delay time set between COF1 and COF2.

Alternatively, all of data lines electrically connected to the reference source driving unit are divided into a first part and a second part. The first part includes the second reference data line, and data transmission delay time of all of data lines in the first part is different from that of all of data lines in the second part. Thus, it is convenient to control and simple and easy to realize.

In FIG. 9, COF1 is used as the reference source driving unit, and the data lines Y1-Y960 in FIG. 9 are divided into a first part Y1-480 and a second part Y960-481. For example, it is provided in the first part Y1-480 that data lines Y1-120 are totally delayed by 32 UI, data lines Y121-240 are totally delayed by 72 UI, data lines Y241-360 are totally delayed by 160 UI, and data lines Y361-480 are totally delayed by 360 UI, and thus the first part Y1-480 is totally delayed by 624 UI; and it is provided in the second part Y960-481 that data lines Y960-841 are totally delayed by 24 UI, data lines Y840-721 are totally delayed by 48 UI, data lines Y720-601 are totally delayed by 120 UI and data lines Y600-481 are totally delayed by 320 UI, and thus the second part Y960-481 are totally delayed by 512 UI.

Alternatively, in the first mode, the data transmission delay time of all of the data lines in the first part is greater than that of all of the data lines in the second part. Thus, it is convenient to control and simple and easy to realize.

In FIG. 9, COF1 is used as the reference source driving unit, and the data lines Y1-Y960 in FIG. 9 are divided into a first part Y1-480 and a second part Y960-481. For example, it is provided in the first part Y1-480 that data lines Y1-120 are totally delayed by 32 UI, data lines Y121-240 are totally delayed by 72 UI, data lines Y241-360 are totally delayed by 160 UI, and data lines Y361-480 are totally delayed by 360 UI, and thus the first part Y1-480 is totally delayed by 624 UI; and it is provided in the second part Y960-481 that data lines Y960-841 are totally delayed by 24 UI, data lines Y840-721 are totally delayed by 48 UI, data lines Y720-601 are totally delayed by 120 UI and data lines Y600-481 are totally delayed by 320 UI, and thus the second part Y960-481 are totally delayed by 512 UI. The first part Y1-480 differs from the second part Y960-481 by 112 UI.

Figure 11:
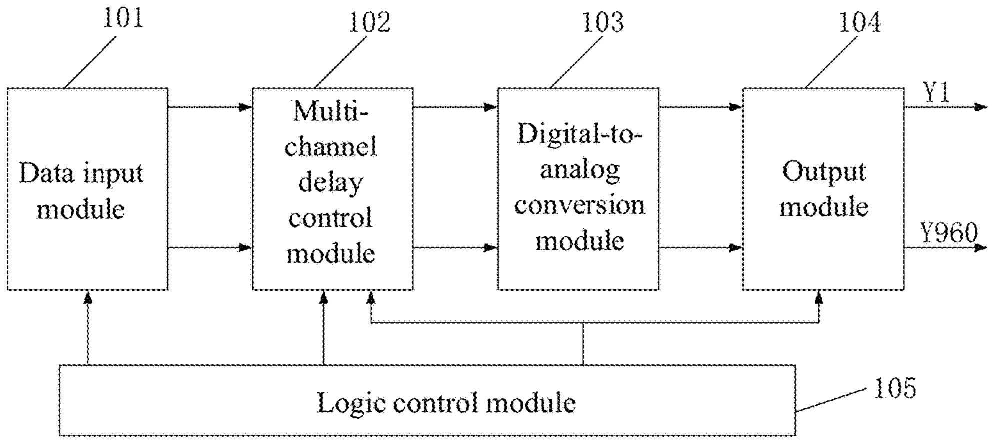
FIG. 11 is a schematic structural diagram of a source driving unit according to an embodiment of the present disclosure.

Alternatively, referring to FIG. 11, the source driving unit includes a data input module 101, a multi-channel delay control module 102, a digital-to-analog conversion module 103, an output module 104 and a logic control module 105.

The data input module 101 is electrically connected to both the logic control module 105 and the multi-channel delay control module 102, and is configured to: receive and analyze a video signal under control of a first control signal of the logic control module 105 so as to obtain first data of the video signal; and transmit the first data to the multi-channel delay control module 102.

The multi-channel delay control module 102 is electrically connected to both the logic control module 105 and the digital-to-analog conversion module 103, and is configured to: receive and analyze the first data under control of a second control signal of the logic control module 105 so as to obtain second data of respective data lines with different start time; and transmit the second data to the digital-to-analog conversion module 103.

The digital-to-analog conversion module 103 is further electrically connected to the output module and is configured to: receive and convert the second data so as to obtain third data; and transmit the third data to the output module 104.

The output module 104 is configured to receive and output the third data.

In the following, a specific workflow flow of the source driving unit shown in FIG. 11 will be described with reference to FIG. 2.

An interface of the data input module 101 can receive a video signal transmitted from the timing control 7 under control of the first control signal of the logic control module 105, for example, at a moment SOE_S, and the video signal may include the first data, a transmission protocol and the like. The first data can be image data, and the interface of the data input module 101 can be a CEDS/USIT interface. Then, the multi-channel delay control module 102 can receive and process the image data under control of the second control signal of the logic control module 105, for example, in a GDE/PPCC mode. Then, the digital-to-analog conversion module 103 receives the processed image data and performs digital-to-analog conversion, for example, an analog voltage after digital-to-analog conversion can be determined under control of gamma voltages GMA1-18. Finally, the output module 104 receives the analog voltage and outputs the image data to respective data lines at different moments.

It should be noted that the logic control module 105 can output a synchronization signal to the multi-channel delay control module 102 and the output module 104 to control the output module to output the digital-to-analog converted analog signal, which is synchronized with a digital signal processed by the multi-channel delay control module 102.

A display device is provided in an embodiment of the present application, which has a programmable charging compensation mode and an adjustment method, can improve compensation flexibility and compensation degree, improve the V-Block problem to the greatest extent, and present good user experience.

Figure 12:
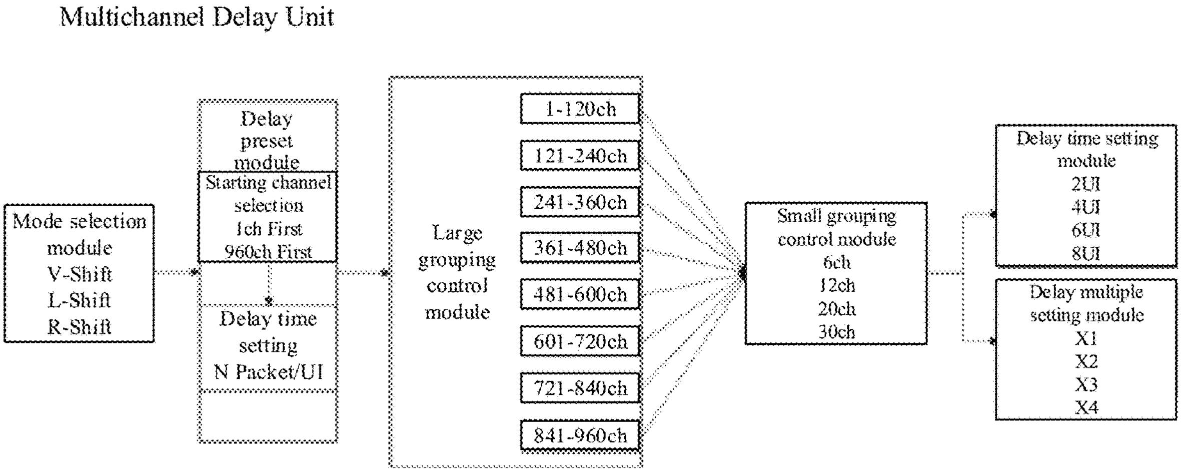
FIG. 12 is a schematic structural diagram of a multi-channel control delay module according to an embodiment of the present disclosure.

Alternatively, referring to FIG. 12, the multi-channel delay control module includes a mode selection submodule 201, a data selection submodule 202, a first grouping control submodule 203, a second grouping control submodule 204 and a delay submodule 205.

The mode selection submodule 201 is electrically connected to the data selection submodule 202 and is configured to: receive the first data under control of the second control signal of the logic control module and select a delay mode; and transmit the first data to the data selection submodule.

The data line selection submodule 202 is further electrically connected to the first grouping control unit 203 and is configured to: receive the first data under the control of the second control signal of the logic control module, determine the delay mode, and select a starting data line according to the delay mode; and transmit the first data to the first grouping control submodule.

The first grouping control sub-module 203 is further electrically connected to the second grouping control unit 204 and is configured to: receive the first data under the control of the second control signal of the logic control module and determine the first data line group according to the starting data line.

The second grouping control sub-module 204 is further electrically connected to the delay unit 205 and is configured to: receive the first data under the control of the second control signal of the logic control module and determine a first sub-data line group according to the first data line group.

The delay sub-module 205 is configured to: receive the first data under the control of the second control signal of the logic control module, and analyze the first data according to the first sub-data line group so as to obtain second data of data lines in the first sub-data line group with different start time.

In the following, a specific workflow of the multi-channel delay control module shown in FIG. 12 will be described with reference to FIG. 11.

The mode selection sub-module 201 can receive the image data under the control of the second control signal of the logic control module 105, for example, in the GDE/PPCC mode, and determine a mode, such as the V-shift mode. Then, the data line selection sub-module 202 receives the image data and determines a data line that transmits the image data signal firstly according to the V-shift mode. Then, the first grouping control sub-module 203 divides the data lines into a plurality of first data line groups, for example, 960chs in a COF can be divided into eight groups, one for every 120chs. Then, the second grouping control sub-module 204 divides each first data line group into a plurality of first sub-data line groups, for example, a group of 120chs can be divided into four first sub-data line groups; and finally, delay time and delay time multiples between the first sub-data line groups are set.

In the specification provided here, a large number of specific details are explained. However, it can be understood that the embodiments of the present application can be practiced without these specific details. In some examples, well-known methods, structures, and techniques are not shown in detail to avoid blurring the understanding of the specification.

Finally, it should be noted that the above embodiments are only used to illustrate the technical solution of the present application, and not to limit it. Although the present application has been described in detail with reference to the aforementioned embodiments, persons skilled in the art should understand that they can still modify the technical solutions recorded in the aforementioned embodiments, or equivalently replace some of the technical features therein. And these modifications or replacements do not make the essence of the corresponding technical solutions deviate from the spirit and scope of the technical solutions in the various embodiments of the present application.

The invention claimed is:

1. A display device, comprising:

a display panel comprising a plurality of gate lines and a plurality of data lines, wherein the plurality of gate lines intersect and are insulated with the plurality of data lines, the display panel further comprises a plurality of sub-pixels arranged in an array, and the plurality of gate lines and the plurality of data lines define areas where the sub-pixels are located;

a gate driver electrically connected to the plurality of gate lines in the display panel; and a source driver bound to the display panel and electrically connected to the plurality of data lines in the display panel, wherein the source driver is configured to set data transmission start time for respective data lines, so that effective charging time of respective sub-pixels formed by the plurality of data lines and a same gate line is same, wherein:

the source driver comprises a source driving unit;

the gate driver is configured to transmit a gate signal in a first preset time range to the gate line;

the source driving unit is configured to transmit data signals to the plurality of data lines, any of a plurality of data lines intersecting a same gate line is taken as a first reference data line, and data transmission start time of the first reference data line is taken as reference time;

in a case that among the plurality of data lines intersecting the same gate line, a gate signal on the gate line at an intersection with the first reference data line is transmitted earliest, data transmission start time of data lines except the first reference data line among the plurality of data lines is later than the reference time, so that effective charging time of respective sub-pixels formed by the plurality of data lines electrically connected to the source driving unit and the same gate line is the same;

in a case that among the plurality of data lines intersecting the same gate line, the gate signal on the gate line at the intersection with the first reference data line is transmitted latest, data transmission start time of the data lines except the first reference data line among the plurality of data lines is earlier than the reference time, so that effective charging time of respective sub-pixels formed by the plurality of data lines electrically connected to the source driving unit and the same gate line is the same;

in a case that among the plurality of data lines intersecting the same gate line, the gate signal on the gate line at the intersection with the first reference data line is transmitted midway, among the plurality of data lines, data transmission start time of a data line of which a data signal is transmitted earlier than the gate signal on the gate line at the intersection with the first reference data line is earlier than the reference time; and among the plurality of data lines, data transmission start time of a data line of which a data signal is transmitted later than the gate signal on the gate line at the intersection with the first reference data line is later than the reference time, so that the effective charging time of the respective sub-pixels formed by the plurality of data lines electrically connected to the source driving unit and the same gate line is the same;

the source driving unit comprises a data input module, a multi-channel delay control module, a digital-to-analog conversion module, an output module and a logic control module;

the data input module is electrically connected to both the logic control module and the multi-channel delay control module, and is configured to: receive and analyze a video signal under control of a first control signal of the logic control module, to obtain first data of the video signal; and transmit the first data to the multi-channel delay control module;

the multi-channel delay control module is electrically connected to both the logic control module and the digital-to-analog conversion module, and is configured to: receive and analyze the first data under control of a second control signal of the logic control module, to obtain second data of respective data lines with different start time; and transmit the second data to the digital-to-analog conversion module;

the digital-to-analog conversion module is further electrically connected to the output module and is configured to: receive and convert the second data, to obtain third data; and transmit the third data to the output module; and the output module is configured to receive and output the third data.

2. The display device according to claim 1, wherein all of the data lines comprise a plurality of first data line groups, and each first data line group comprises a plurality of data lines;

the source driving unit is configured to take any of the plurality of first data line groups intersecting the same gate line as a first reference data line group, and take data transmission start time of the first reference data line group as a reference time; and in a case that among the plurality of first data line groups intersecting the same gate line, a gate signal on the gate line at an intersection with the first reference data line group is transmitted earliest, data transmission start time of first data line groups except the first reference data line group among the plurality of first data line groups is later than the reference time, so that effective charging time of respective sub-pixels formed by data lines in the plurality of first data line groups electrically connected to the source driving unit and the same gate line is the same;

in a case that among the plurality of first data line groups intersecting the same gate line, the gate signal on the gate line at the intersection with the first reference data line group is transmitted latest, data transmission start time of the first data line groups except the first reference data line group among the plurality of first data line groups is earlier than the reference time, so that effective charging time of respective sub-pixels formed by data lines in the plurality of first data line groups electrically connected to the source driving unit and the same gate line is the same; and in a case that among the plurality of first data line groups intersecting the same gate line, the gate signal on the gate line at the intersection with the first reference data line group is transmitted midway, among the plurality of first data line groups, data transmission start time of a first data line group of which a data signal is transmitted earlier than the gate signal on the gate line at the intersection with the first reference data line group is earlier than the reference time; and among the plurality of first data line groups, data transmission start time of a first data line group of which a data signal is transmitted later than the gate signal on the gate line at the intersection with the first reference data line group is later than the reference time, so that effective charging time of respective sub-pixels formed by data lines in the plurality of first data line groups electrically connected to the source driving unit and the same gate line is the same.

3. The display device according to claim 2, wherein a quotient of a number of all of data lines and a number of all of the first data line groups is an integer, and a number of the data lines in each first data line group is the same.

4. The display device according to claim 3, wherein the source driving unit is configured such that all of data lines in each first data line group comprise a plurality of first sub-data line groups, and each of the plurality of first sub-data line groups include at least one data line; and any of a plurality of first sub-data line groups intersecting the same gate line is taken as a second reference data line group, and data transmission start time of the second reference data line group is taken as a reference time;

in a case that among the plurality of first sub-data line groups intersecting the same gate line, a gate signal on a gate line at an intersection with the second reference data line group is transmitted earliest, data transmission start time of first sub-data line groups except the second reference data line group among the plurality of first sub-data line groups is later than the reference time, so that effective charging time of respective sub-pixels formed by data lines in the plurality of first sub-data line groups electrically connected to the source driving unit and the same gate line is the same;

in a case that among the plurality of first sub-data line groups intersecting the same gate line, the gate signal on the gate line at the intersection with the second reference data line group is transmitted latest, data transmission start time of the first sub-data line groups except the second reference data line group among the plurality of first sub-data line groups is earlier than the reference time, so that effective charging time of respective sub-pixels formed by data lines in the plurality of first sub-data line groups electrically connected to the source driving unit and the same gate line is the same; and in a case that among the plurality of first sub-data line groups intersecting the same gate line, the gate signal on the gate line at the intersection with the second reference data line group is transmitted midway, among the plurality of first sub-data line groups, data transmission start time of a first sub-data line group of which a data signal is transmitted earlier than the gate signal on the gate line at the intersection with the second reference data line group is earlier than the reference time; and among the plurality of first sub-data line groups, data transmission start time of a first sub-data line group of which a data signal is transmitted later than the gate signal on the gate line at the intersection with the second reference data line group is later than the reference time, so that effective charging time of respective sub-pixels formed by data lines in the plurality of first sub-data line groups electrically connected to the source driving unit and the same gate line is the same.

5. The display device according to claim 4, wherein data transmission start time of all of the data lines in each first sub-data line group is the same.

6. The display device according to claim 4, wherein the plurality of first sub-data line groups are arranged in a direction away from the gate driver sequentially, and the source driving unit is configured to take any of the plurality of first sub-data line groups intersecting the same gate line as a third reference data line group, and take data transmission start time of the third reference data line group as a reference time;

in a case that among the plurality of first sub-data line groups intersecting the same gate line, the third reference data line group is located closest to the gate driver, data transmission start time of first sub-data line groups except the third reference data line group among the plurality of first sub-data line groups is later than the reference time, so that effective charging time of respective sub-pixels formed by data lines in the plurality of first sub-data line groups electrically connected to the source driving unit and the same gate line is the same;

in a case that among the plurality of first sub-data line groups intersecting the same gate line, the third reference data line group is located farthest from the gate driver, data transmission start time of the first sub-data line groups except the third reference data line group among the plurality of first sub-data line groups is earlier than the reference time, so that effective charging time of respective sub-pixels formed by data lines in the plurality of first sub-data line groups electrically connected to the source driving unit and the same gate line is the same; and in a case that among the plurality of first sub-data line groups intersecting the same gate line, the third reference data line group is located in the middle of a distance from the gate driver, among the plurality of first sub-data line groups, data transmission start time of a first sub-data line group which is closer to the gate driver than the third reference data line group is earlier than the reference time; and among the plurality of first sub-data line groups, data transmission start time of a first sub-data line group which is farther from the gate driver than the third reference data line group is later than the reference time, so that effective charging time of respective sub-pixels formed by data lines in the plurality of first sub-data line groups electrically connected to the source driving unit and the same gate line is the same.

7. The display device according to claim 6, wherein all of the data lines intersecting the same gate line comprise M first data line groups, and the M first data line groups are sorted in the direction away from the gate driver sequentially; and in a first mode, among the M first data line groups, a number of data lines in a first data line group of an N-th sequence is the same as that of data lines in a first data line group of an (M-N+1)-th sequence, and both of which are even numbers, where M is an even number greater than or equal to 2, and N is an integer greater than or equal to 1.

8. The display device according to claim 7, wherein in the direction away from the gate driver, data transmission start time of respective first data line groups increases sequentially.

9. The display device according to claim 8, wherein each of the plurality of first data line groups intersecting the same gate line comprises an even number of the first sub-data line groups; and in the direction away from the gate driver, a number of the first sub-data line groups in each first data line group increases sequentially.

10. The display device according to claim 9, wherein in the direction away from the gate driver, data transmission start time of the first sub-data line groups in respective first data line groups is sequentially increased by a same multiple.

11. The display device according to claim 1, wherein the multi-channel delay control module comprises a mode selection submodule, a data selection submodule, a first grouping control submodule, a second grouping control submodule and a delay submodule;

the mode selection submodule is electrically connected to the data selection submodule and is configured to: receive the first data under control of the second control signal of the logic control module and select a delay mode; and transmit the first data to the data selection submodule;

the data line selection submodule is further electrically connected to the first grouping control unit and is configured to: receive the first data under the control of the second control signal of the logic control module, determine the delay mode, and select a starting data line according to the delay mode; and transmit the first data to the first grouping control submodule;

the first grouping control sub-module is further electrically connected to the second grouping control unit and is configured to: receive the first data under the control of the second control signal of the logic control module, and determine the first data line group according to the starting data line;

the second grouping control sub-module is further electrically connected to the delay unit and is configured to: receive the first data under the control of the second control signal of the logic control module and determine a first sub-data line group according to the first data line group; and the delay sub-module is configured to: receive the first data under the control of the second control signal of the logic control module, and analyze the first data according to the first sub-data line group, to obtain the second data of data lines in the first sub-data line group with different start time.

12. A display device, comprising:

a display panel comprising a plurality of gate lines and a plurality of data lines, wherein the plurality of gate lines intersect and are insulated with the plurality of data lines, the display panel further comprises a plurality of sub-pixels arranged in an array, and the plurality of gate lines and the plurality of data lines define areas where the sub-pixels are located;

a gate driver electrically connected to the plurality of gate lines in the display panel; and a source driver bound to the display panel and electrically connected to the plurality of data lines in the display panel, wherein the source driver is configured to set data transmission start time for respective data lines, so that effective charging time of respective sub-pixels formed by the plurality of data lines and a same gate line is same, wherein:

the source driver comprises a plurality of source driving units;

the gate driver is configured to transmit a gate signal in a first preset time range to the gate line;

the plurality of data lines are divided into a plurality of groups, and each source driving unit is electrically connected to one group of the data lines, any of the plurality of source driving units is taken as a reference source driving unit, and rest of the source driving units except the reference source driving unit are adjusting source driving units; any data line in the plurality of groups of the data lines intersecting the same gate line electrically connected to the reference source driving unit is taken as a second reference data line, and data transmission start time of the second reference data line is taken as a reference time; one of data lines electrically connected to the reference source drive unit closest to an adjacent adjusting source drive unit is a first data line, and a data line in the adjusting source drive unit closest to the reference source drive unit is a second data line; and in a case that among the plurality of groups of the data lines intersecting the same gate line, a gate signal on a gate line at an intersection with the second reference data line is transmitted earliest, data transmission start time of the first data line is later than the reference time, and the data transmission start time of the first data line is the same as that of the second data line, so that effective charging time of respective sub-pixels formed by data lines in the plurality of groups of the data lines electrically connected to the source driving unit and the same gate line is the same.

13. The display device according to claim 12, wherein all of the data lines electrically connected to the reference source driving unit are divided into a first part and a second part, the first part comprises the second reference data line, and data transmission delay time of all of data lines in the first part is different from that of all of data lines in the second part.

14. The display device according to claim 13, wherein in the first mode, the data transmission delay time of all of the data lines in the first part is greater than that of all of the data lines in the second part.

15. The display device according to claim 12, wherein the source driving unit comprises a data input module, a multi-channel delay control module, a digital-to-analog conversion module, an output module and a logic control module;

the data input module is electrically connected to both the logic control module and the multi-channel delay control module, and is configured to: receive and analyze a video signal under control of a first control signal of the logic control module, to obtain first data of the video signal; and transmit the first data to the multi-channel delay control module;

the multi-channel delay control module is electrically connected to both the logic control module and the digital-to-analog conversion module, and is configured to: receive and analyze the first data under control of a second control signal of the logic control module, to obtain second data of respective data lines with different start time; and transmit the second data to the digital-to-analog conversion module;

the digital-to-analog conversion module is further electrically connected to the output module and is configured to: receive and convert the second data, to obtain third data; and transmit the third data to the output module; and the output module is configured to receive and output the third data.

16. The display device according to claim 15, wherein the multi-channel delay control module comprises a mode selection submodule, a data selection submodule, a first grouping control submodule, a second grouping control submodule and a delay submodule;

the mode selection submodule is electrically connected to the data selection submodule and is configured to: receive the first data under control of the second control signal of the logic control module and select a delay mode; and transmit the first data to the data selection submodule;

the data line selection submodule is further electrically connected to the first grouping control unit and is configured to: receive the first data under the control of the second control signal of the logic control module, determine the delay mode, and select a starting data line according to the delay mode; and transmit the first data to the first grouping control submodule;

the first grouping control sub-module is further electrically connected to the second grouping control unit and is configured to: receive the first data under the control of the second control signal of the logic control module, and determine the first data line group according to the starting data line;

the second grouping control sub-module is further electrically connected to the delay unit and is configured to: receive the first data under the control of the second control signal of the logic control module and determine a first sub-data line group according to the first data line group; and the delay sub-module is configured to: receive the first data under the control of the second control signal of the logic control module, and analyze the first data according to the first sub-data line group, to obtain the second data of data lines in the first sub-data line group with different start time.

* * * * *